US012249334B2

(12) United States Patent
Graff et al.

(10) Patent No.: US 12,249,334 B2
(45) Date of Patent: Mar. 11, 2025

(54) SYSTEMS AND METHODS FOR IDENTIFYING CONVERSATION ROLES

(71) Applicant: OPEN TEXT HOLDINGS, INC., San Mateo, CA (US)

(72) Inventors: Steven John Graff, Grapevine, TX (US); Sayeed Khawja Mohammed, Plano, TX (US); Devanshu D. Sheth, Dallas, TX (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 213 days.

(21) Appl. No.: 17/243,330

(22) Filed: Apr. 28, 2021

(65) Prior Publication Data

US 2021/0335367 A1    Oct. 28, 2021

Related U.S. Application Data

(60) Provisional application No. 63/016,839, filed on Apr. 28, 2020.

(51) Int. Cl.
*G10L 15/26* (2006.01)
*G06F 9/54* (2006.01)
(Continued)

(52) U.S. Cl.
CPC .............. *G10L 15/26* (2013.01); *G06F 9/547* (2013.01); *G06F 40/20* (2020.01); *G10L 15/005* (2013.01)

(58) Field of Classification Search
CPC ....... G10L 15/26; G10L 15/005; G06F 9/547; G06F 40/20; G06F 40/30
(Continued)

(56) References Cited

U.S. PATENT DOCUMENTS 7,631,343 B1 * 12/2009 Bennett .................. G10L 15/26
   726/4
8,515,765 B2 *  8/2013 Baldwin ................ G10L 25/63
   704/270.1
(Continued)

FOREIGN PATENT DOCUMENTS

WO    WO2015100362    7/2015

OTHER PUBLICATIONS

International Search Report and Written Opinion issued for International PCT Application No. PCT/US2021/029721, mailed Jul. 27, 2021, 6 pages.
(Continued)

*Primary Examiner* — Thuykhanh Le
(74) *Attorney, Agent, or Firm* — Sprinkle IP Law Group (57) ABSTRACT

A text mining engine running on an artificial platform is trained to perform conversation role identification, semantic analysis, summarization, language detection, etc. The text mining engine analyzes words in a transcript that represent unique characteristics of a conversation and, based on the unique characteristics and utilizing classification predictive modeling, determines a conversation role for each participant of the conversation and metadata describing the conversation such as tonality of words spoken by a participant in a particular conversation role. Outputs from the text mining engine are indexed and useful for various purposes. For instance, because the system can identify which speaker in a customer service call is likely an agent and which speaker is likely a customer, words spoken by the agent can be analyzed for compliance reasons, training agents, providing quality assurance for improving customer service, providing feedback to improve the performance of the text mining engine, etc.

23 Claims, 9 Drawing Sheets

(51) Int. Cl.
*G06F 40/20* (2020.01)
*G10L 15/00* (2013.01)

(58) Field of Classification Search
USPC .......................................................... 704/231
See application file for complete search history.

(56) References Cited

U.S. PATENT DOCUMENTS

| | | | |
|---|---|---|---|
| 10,395,648 B1 | 8/2019 | Benkreira et al. | |
| 10,735,592 B1* | 8/2020 | Liu | H04L 67/306 |
| 10,824,979 B1* | 11/2020 | Veloso | G06Q 30/016 |
| 11,140,265 B1* | 10/2021 | Palmer | H04M 3/2281 |
| 11,544,924 B1* | 1/2023 | Lee | G08B 13/19608 |
| 11,631,401 B1* | 4/2023 | Nudd | G16H 80/00 704/9 |
| 11,869,509 B1* | 1/2024 | Agassi | G06F 40/30 |
| 12,039,982 B2* | 7/2024 | El Shafey | G10L 15/22 |
| 2004/0167911 A1* | 8/2004 | Wakefield | G06F 16/313 |
| 2009/0313225 A1* | 12/2009 | Nordlinger | G06Q 10/10 707/999.009 |
| 2014/0140497 A1* | 5/2014 | Ripa | H04M 3/5175 379/265.06 |
| 2015/0178371 A1* | 6/2015 | Seth | G06F 40/117 707/755 |
| 2017/0004517 A1* | 1/2017 | Jaggi | G06Q 30/0203 |
| 2017/0177711 A1* | 6/2017 | Thomas | G06F 16/1805 |
| 2017/0263245 A1* | 9/2017 | Mizumoto | G10L 15/08 |
| 2018/0239959 A1* | 8/2018 | Bui | G06F 16/93 |
| 2018/0254051 A1* | 9/2018 | Church | H04M 3/51 |
| 2018/0336898 A1* | 11/2018 | Cook | H04M 3/51 |
| 2018/0336899 A1* | 11/2018 | Cook | H04L 65/1083 |
| 2019/0245973 A1 | 8/2019 | Dwyer et al. | |
| 2019/0253558 A1 | 8/2019 | Haukioja et al. | |
| 2019/0327103 A1* | 10/2019 | Niekrasz | G10L 15/26 |
| 2019/0364131 A1* | 11/2019 | Rogynskyy | H04M 15/60 |
| 2019/0379791 A1 | 12/2019 | Winter et al. | |
| 2019/0394057 A1* | 12/2019 | Bujnowski | H04L 12/18 |
| 2020/0243095 A1* | 7/2020 | Adlersberg | G06F 40/216 |
| 2020/0279567 A1* | 9/2020 | Adlersberg | G06F 40/35 |
| 2020/0342138 A1* | 10/2020 | Ju | G10L 15/26 |
| 2020/0342860 A1* | 10/2020 | Ju | G10L 21/028 |
| 2020/0403818 A1* | 12/2020 | Daredia | G10L 17/00 |
| 2021/0081497 A1* | 3/2021 | Qin | G06V 20/40 |
| 2021/0125190 A1* | 4/2021 | Coman | G06Q 30/016 |
| 2021/0142785 A1* | 5/2021 | Wang | G10L 13/047 |
| 2021/0150654 A1* | 5/2021 | Moradzadeh | H04W 4/80 |
| 2021/0157834 A1* | 5/2021 | Sivasubramanian | G06F 16/686 |
| 2021/0158235 A1* | 5/2021 | Sivasubramanian | H04M 3/5191 |
| 2021/0183488 A1* | 6/2021 | Reisfeld | G06N 20/10 |
| 2021/0272128 A1* | 9/2021 | Slawson | G06F 40/30 |
| 2021/0304107 A1* | 9/2021 | Fink | G06Q 10/06398 |
| 2021/0335367 A1* | 10/2021 | Graff | H04M 3/5175 |
| 2022/0050922 A1* | 2/2022 | Ju | G06F 40/295 |
| 2022/0199094 A1* | 6/2022 | El Shafey | G06N 3/08 |
| 2024/0236234 A1* | 7/2024 | Soundar | H04M 3/54 |

OTHER PUBLICATIONS

International Preliminary Report on Patentability (IPRP) issued for International PCT Application No. PCT/US2021/029721, mailed Nov. 10, 2022, 5 pages.

Extended European Search Report issued by the European Patent Office (EPO) for European Patent Application No. 21796603.5, mailed Apr. 2, 2024, 10 pages.

* cited by examiner

```
┌─────────────────────────────────────────────────────────────────────┐
│ Analytics Tools                                                   > │
├─────────────────────────────────────────────────────────────────────┤
│ Playlist                                                            │
├─────────────────────────────────────────────────────────────────────┤
│ Transcript                                                          │
├─────────────────────────────────────────────────────────────────────┤
│   ⬤  Autoscroll       ● Agent 49%    ○ Caller 51%                   │
│                                                                     │
│   ┌──────────────────────────────────────┐  ┌──────────┐ ∨ ∧        │
│   │ e-mail                               │  │ Either  ▼│             │
│   └──────────────────────────────────────┘  ├──────────┤             │
│                              Advanced Search │ Either   │             │
│   Agent: Hello and thank you for calling AuraMart my name is Justin │
│   today                                     │ Agent    │             │
│   ▷ Caller: I signed up on your Facebook │fan page so│ I can receive yo│
│   received the e-mail last week for special promo on your CompCo elite book laptops│
│   Agent: yes sir I remember that can how can help you              │
│   Caller: well I clicked on the link to buy the product and I received an out of stock error│
│   message a check out time                                         │
│   Agent: okay let me check the system and see if that product still in stock that was a very│
│   popular promotion                                                │
│   Caller: okay                                                     │
│   Agent: sir that laptop it is in stock when you receive the out of stock air where│
│   you logged into the website                                      │
│   Caller: yes I was                                                │
│   Agent: if you can tell me your e-mail address I can see whet happening during your visit│
│   Caller: really am my e-mail address is R simms thirty five@yahoo .com│
│   Agent: okay give me just a minute end I'll go into the system and see if I can find the│
│   recording from your website visit                                │
│   Caller: okay man be cool                                         │
│   Agent: okay so I found your interaction Rob can you tell me your address and make sure│
│   I found the proper one                                           │
│   Caller: not sure my name is Rob simms at forty one let Gate Hill Snider Texas│
│   Agent: okay so it looks like yeah looks like I have your recording from the website I'm│
│   seeing that you were trying to purchase the CompCo elite book eighty four seventy is that│
│   correct                                                          │
│   Caller: yes and when I got to the                                │
├─────────────────────────────────────────────────────────────────────┤
│ AutoScore                                                           │
├─────────────────────────────────────────────────────────────────────┤
│ Desktop Analytics                                                   │
└─────────────────────────────────────────────────────────────────────┘
                              ↗
                             400           FIG. 4
```

Search Options

| | |
|---|---|
| Search Expression: | ((bill)^100 OR (invoice)^100 OR (recipt)^100) |
| Exclude Words: | Exclude all terms in this lexicon |
| Types: | Recordings |
| Date: | (any date) |

Include results that have [all] of the following:

Speaker [equal to] Caller  + ×
- ☑ Caller
- ☐ Agent

[ Ok ] [ Cancel ]

Interaction Analysis Report ✕

| Combined | Agent Side | Caller Side |

Recording Summarization

Agent Summarization: Looks like yeah it looks like i have your recording from the web site and i am seeing that you were trying to purchase the Envy DV seven seventy two forty is that correct. Something in the system that caused it to fail. If you buy it now ok so the price is six forty nine ninety nine for the laptop fifty five dollars for that leather laptop bag and seventy dollars for the red carpet extended warranty plus five dollars flat rate for shipping coming out to a total of seven hundred seventy nine dollars and ninety nine cents. Ok rob so I got your order submitted you will receive an email shortly with the order details.

Sentiment Analysis - Agent Side

Language: English     Agent Side     Overall Tone: Positive

16% Negative
61% Neutral
27% Positive

| Most Positive Sentences | Most Negative Sentences |
|---|---|
| Hh yes sir i remember that how can i help you. | So i'm not sure it looks like you did everything correctly but there was something in the system that caused it to fail |
| Good morning and thanks for calling AuraMart this is Cobb how can i help you today. | |
| Ok let me check the system to see if that product is still in stock that was a very popular promotion. | Shipping method screen you actually received the out of stock error message. |
| Ok rob so i got your order submitted you will receive an email shortly with the order details you have a pen handy. | |

FIG. 6
600

Edit AutoScore Template: Drive_Customers_to_New_Web_Site

General

Name (required): Drive_Customers_to_New_Web_Site

Description: All agents need to drive our customers to the newly designed web site ☑ Enabled

Scoring

Base score: 0   Highest Possible

⊕ Add Lexicon

Configure Lexicon                           nxn =Multiplier (?)

⊖ Drive Customers to new WebSite   | Agent ▼ |   ——————●  nxn
                                                     100
                                    | Agent   |
                                    | Caller  |
                                    | Either  |

Configure Auto-Fail Lexicon

⊕ Add Auto-Fail Lexicon

Regardless of points awarded or deducted, minimum score = 0, maximum score = 100

Target
"*" of type Recordings

Execution Date Range (?)

Start Date: 09/02/16   End Date: 09/05/16

Created: Manager, Manager on 2016-09-02 11:13:33

[ Save ]  [ Cancel ]

SYSTEMS AND METHODS FOR IDENTIFYING CONVERSATION ROLES

CROSS-REFERENCE TO RELATED APPLICATION(S)

This application claims a benefit of priority under 35 U.S.C. § 119(e) from U.S. Provisional Application No. 63/016,839, filed Apr. 28, 2020, entitled "SYSTEMS AND METHODS FOR IDENTIFYING CONVERSATION ROLES," which is hereby fully incorporated by reference herein for all purposes.

TECHNICAL FIELD

This disclosure relates generally to customer experience management. More particularly, this disclosure relates to content analytics and text mining techniques for customer experience management purposes. Even more particularly, this disclosure relates to systems, methods, and computer program products for identifying conversation roles through content analytics and text mining operations performed by artificial intelligence (AI).

BACKGROUND OF THE RELATED ART

Customer experience management (CEM) generally refers to the process that enterprises use to manage and track interactions with their customers. An important part of CEM is the management of customer communications.

Today, customer service centers may answer customer calls from virtually anywhere in the world. In the past, it may not be all that important to know the roles of those involved in a customer service call. However, it has become increasingly important to identify roles in a conversation for many reasons, for instance, CEM, compliance, training, and so on.

In some cases, a customer service representative or agent is not allowed to say or imply certain things or make any explicit or implicit promises. This is particularly the case in regulated industries such as the banking industry, healthcare industry, etc.

Currently, speech-to-text recognition technologies are not yet able to identify roles of those involved in a conversation. This is, in part, due to the informal, often unstructured, nature of how humans tend to speak to one another. Particularly, during a customer service call, multiple issues may be raised. Additionally, unexpected topics or even topics unrelated to the purpose of the call may be discussed randomly and/or arbitrarily. As such, participants of the call may engage in a conversation in an unorganized manner. Incomplete sentences and/or words can make it even more difficult to determine who is the customer and who is the agent in the conversation. The longer the conversation is, the more difficult it becomes to determine conversation roles. Further complicating the matter is the evolving uses of terms, phrases, grammar, etc. and various dialects or even languages that may be involved in a conversation.

In view of the foregoing, there is room for innovations and improvements in identifying conversation roles for CEM purposes.

SUMMARY OF THE DISCLOSURE

A goal of the invention disclosed herein is to provide a reliable GEM software and back office workforce performance optimization solution that incorporates the advanced tools needed in today's global and multi-site customer service centers for CEM purposes. This solution can be implemented on a single CEM platform in which all calls for compliance management can be recorded. Additionally or alternatively, voice and desktop activities can be selectively captured by the CEM platform for quality assurance purposes.

The inventive solution provides an AI-based engine adapted for identifying unique customer call characteristics. The unique customer call characteristics thus identified by the AI-based engine can be used to distinguish the agent from the caller. The ability to distinguish the agent from the caller allows for the identification of the speaker in a conversation as the Agent or the Caller. A system implementing the invention can include a user interface for updating a knowledgebase used by the AI-based engine, allowing an authorized user (e.g., an administrator of the CEM platform) to improve accuracy of conversation role identification where necessary. One embodiment supports the identification of conversation roles in English. Other embodiments supporting different natural languages may also be possible.

In some embodiments, a method for conversation role identification can include receiving or obtaining a transcript of a conversation, wherein the transcript is generated from an audio of the conversation utilizing a speech-to-text recognition tool and wherein the transcript has no metadata describing participants of the conversation. The method can further include making an application programming interface (API) call with the transcript to a text mining engine running on an artificial intelligence platform. The API call specifies a categorization functionality of the text mining engine for identifying conversation roles of the participants of the conversation. The text mining engine is trained to perform conversation role identification in addition to semantic analysis, summarization, language detection, etc. For the conversation role identification, the text mining engine is trained using examples of conversations among people with known conversation roles. The text mining engine analyzes words in a transcript that represent unique characteristics of a conversation and, based on the unique characteristics and utilizing classification predictive modeling, determines a conversation role for each participant of the conversation and metadata describing the conversation such as tonality of words spoken by a participant in a particular conversation role.

Outputs from the text mining engine are indexed and useful for various purposes. For instance, because the system can identify which speaker in a customer service call is likely an agent and which speaker is likely a customer, words spoken by the agent can be analyzed for compliance reasons, training agents, providing quality assurance for improving customer service, providing feedback to improve the performance of the text mining engine, etc.

In some embodiments, the method can further include generating an interaction analysis report on the agent, the customer, or both, the interaction analysis report including a tonality result from the sentiment analysis. In some embodiments, the method can further include generating an administrative interface with analytics tools for analyzing what is said in the conversation by the agent, the caller, or both. In some embodiments, the method can further include generating an administrative interface with quality assurance configuration input fields for setting up quality assurance measures for determining whether the agent meets a quality assurance goal. In some embodiments, the method can further include generating an administrative interface with a search function supported by a search engine.

One embodiment may comprise a system having a processor and a memory and configured to implement a method disclosed herein. One embodiment may comprise a computer program product that comprises a non-transitory computer-readable storage medium storing computer instructions that are executable by a processor to perform the location threat monitoring method disclosed herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Figure 1:
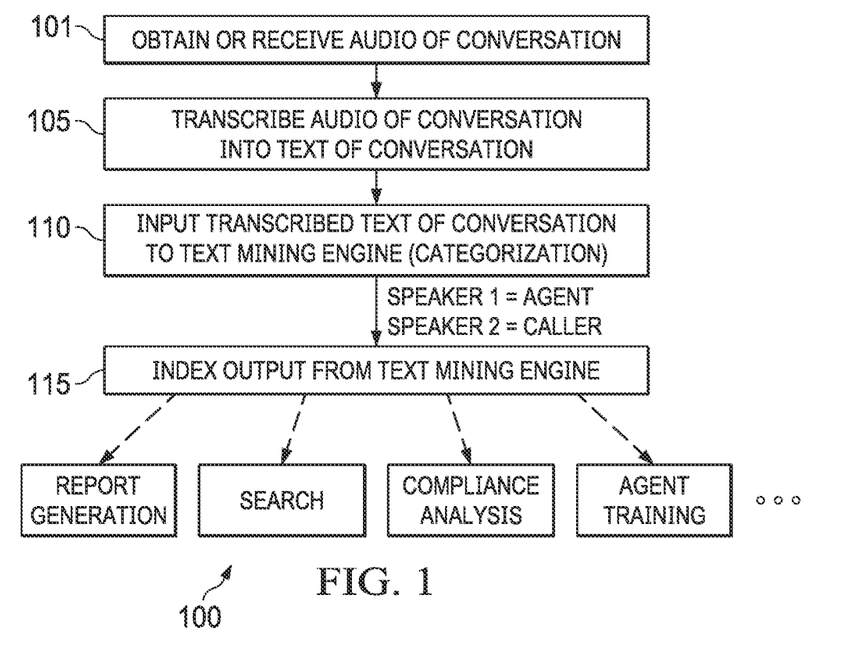
FIG. 1 is a flow chart showing an example of a method for identifying conversation roles according to some embodiments.
Figure 3:
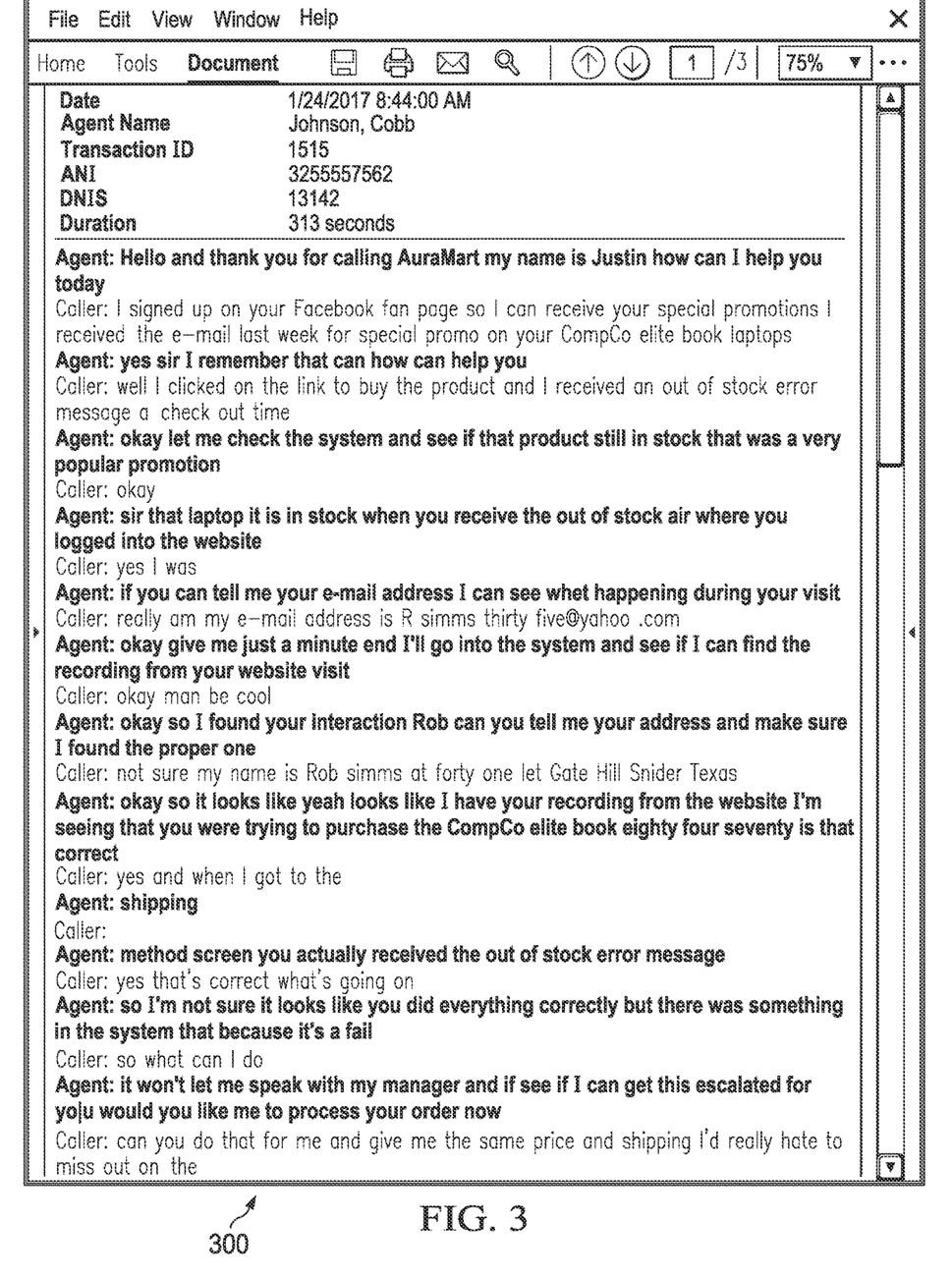
FIG. 3 shows a sample transcript with text transcribed from a conversation audio file according to some embodiments.

FIG. 1 is a flow chart showing an example of a method 100 for identifying conversation roles according to some embodiments. In some embodiments, method 100 may comprise obtaining or receiving an audio file of a conversation (101). In some cases, a pre-processing system or service can be leveraged to process the audio file in which the audio of the conversation is transcribed into text (105). A transcript of the conversation (e.g., a customer service call) is then provided to a text mining engine for categorization based on conversation roles (110). FIG. 3 shows a sample transcript 300 with text transcribed from a conversation audio file according to some embodiments. Those skilled in the art appreciate that the conversation can occur between participants of various roles and are not limited to an agent and a customer. For instance, a conversation can take place between a lawyer and a client, a teacher and a student, a parent and a child, a doctor and a patient, etc. Furthermore, the number of participants in a conversation (e.g., a customer service call, a chat session, a video conference, a virtual doctor visit, etc.) can be two or more. Likewise, the number of conversation roles in a conversation can be more than two, depending at least in part on how the text mining engine is trained and the taxonomy of the knowledgebase used by the text mining engine (e.g., a medical taxonomy, a legal taxonomy, etc.).

The text mining engine is trained to determine and classify members of a conversation, such as who is the agent and who is the customer, based on words representing unique customer call characteristics contained in the transcript (e.g., words usually used by a physician or healthcare provider versus words usually used by a patient or a caregiver). This is a difficult and complex problem because it involves understanding the meaning of spoken language, informal nature of a conversation (e.g., a conversation that may not follow grammatical rules), clarity of spoken words, accents of individuals, possible different dialects used, etc. The output from the text mining engine can then be indexed (e.g., in index 214) and used for various purposes such as report generation, search, compliance analysis, agent training, and so on, using an administrative interface 240 generated by an interface module 216 of the CEM system 210 (115).

Figure 2:
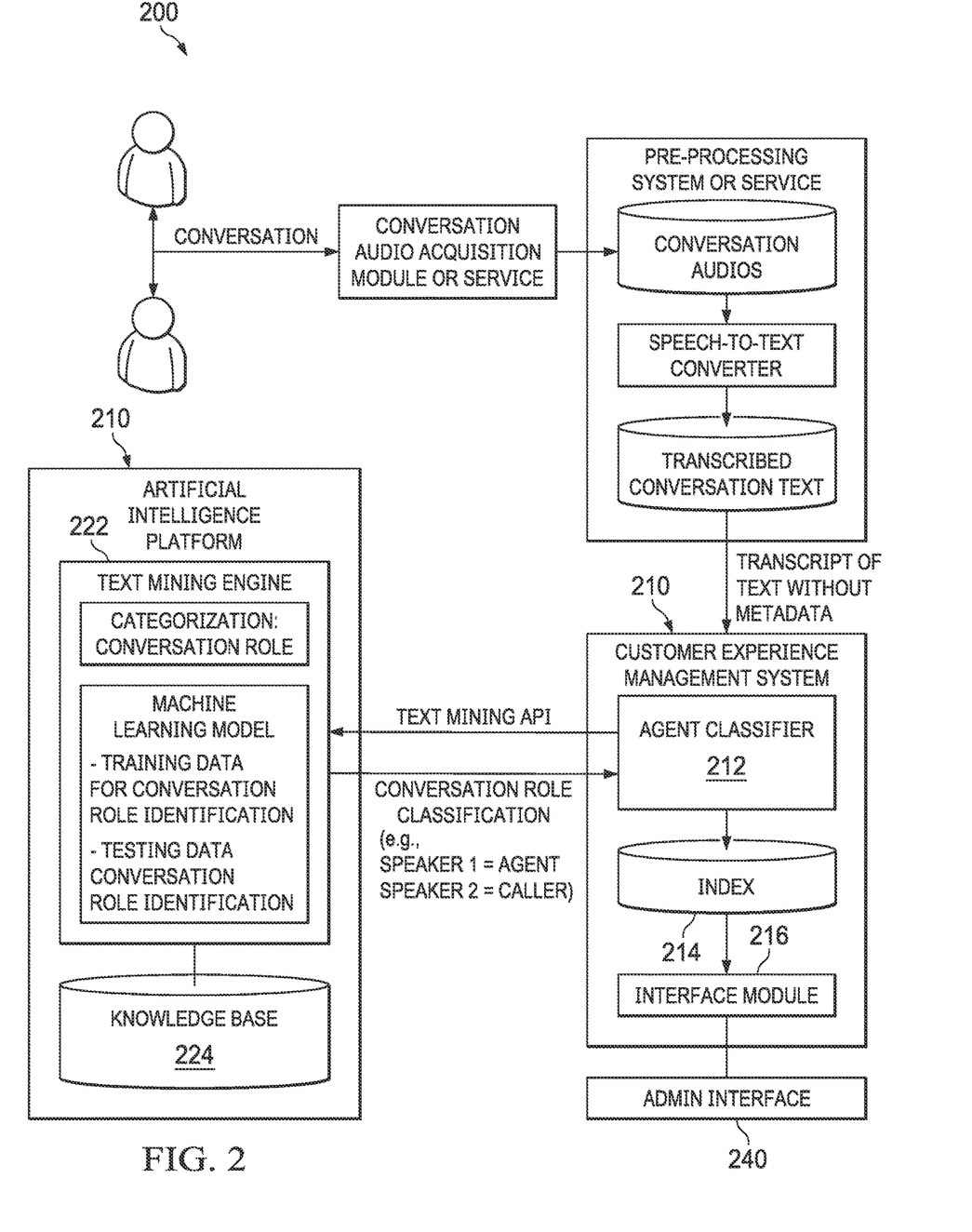
FIG. 2 depicts a diagrammatic representation of a networked computing environment in which embodiments disclosed herein can be implemented.

As illustrated in FIG. 2, which shows a networked computing environment 200, embodiments disclosed herein leverage a text mining engine running 222 on an AI platform 220 to analyze texts transcribed from a conversation. The text mining engine is capable of performing a variety of content analytics and text mining operations, including categorization, classification, semantic analysis, summarization, speaker identification (agent classification), language detection, entity extraction, etc.

In the example of FIG. 2, text mining engine 222 is called by an agent classifier 212 running on a CEM system 210 to perform association in a series of processing operations. In some embodiments, the agent classifier running on the CEM system is operable to make a categorization application programming interface (API) call with transcribed text to the text mining engine running on the AI platform. The text mining engine is operable to process the transcribed text and output a score for each speaker, which is used to classify whether the speaker is an agent (e.g., a call center representative) or a customer. Those skilled in the art appreciate that embodiments disclosed herein can be implemented in many ways. For instance, in some embodiments, CEM system 210 may operate independently of AI platform 220. In some embodiments, the CEM system may be integrated with the AI platform. In one embodiment, the CEM system and the AI platform may be part of an enterprise system.

In one embodiment, the communication between the agent classifier running on the CEM platform and the text mining engine running on the AI platform can occur in real time, while the conversation is ongoing. In other embodiments, the communication between the agent classifier running on the CEM platform and the text mining engine running on the AI platform can occur asynchronously to the conversation. For instance, the conversation can be acquired at a first time point and processed at a second time point after the first time point.

As alluded to above, in a conversation, it can be very difficult for a machine to identify who is the agent (e.g., a customer service representative) and who is the customer after the first exchange (e.g., within the first five seconds). Thus, the agent classifier running on the CEM platform can acquire a transcript of the first exchange (e.g., five seconds) and call the text mining engine with the transcribed text. As a non-limiting example, the transcript can be provided by a third party service provider or pre-processing platform that captures customer service calls made to a call center and/or chat sessions taking place at a web site. Unlike electronic documents such as an email, the transcript of such a customer service call or chat session does not have metadata. Even so, the text mining engine may process the transcribed text and attempt to categorize the first exchange (e.g., whether it is spoken by an agent or a customer), utilizing a knowledgebase that stores speaker-related information. As the conversation continues, the agent classifier running on the CEM platform may capture the audio of the conversation for a period of time (e.g., 45 seconds), transcribe the captured audio, and again call the text mining engine with the transcribed text. As discussed above, this processing does not need to take place with the conversation simultaneously.

Figure 4:
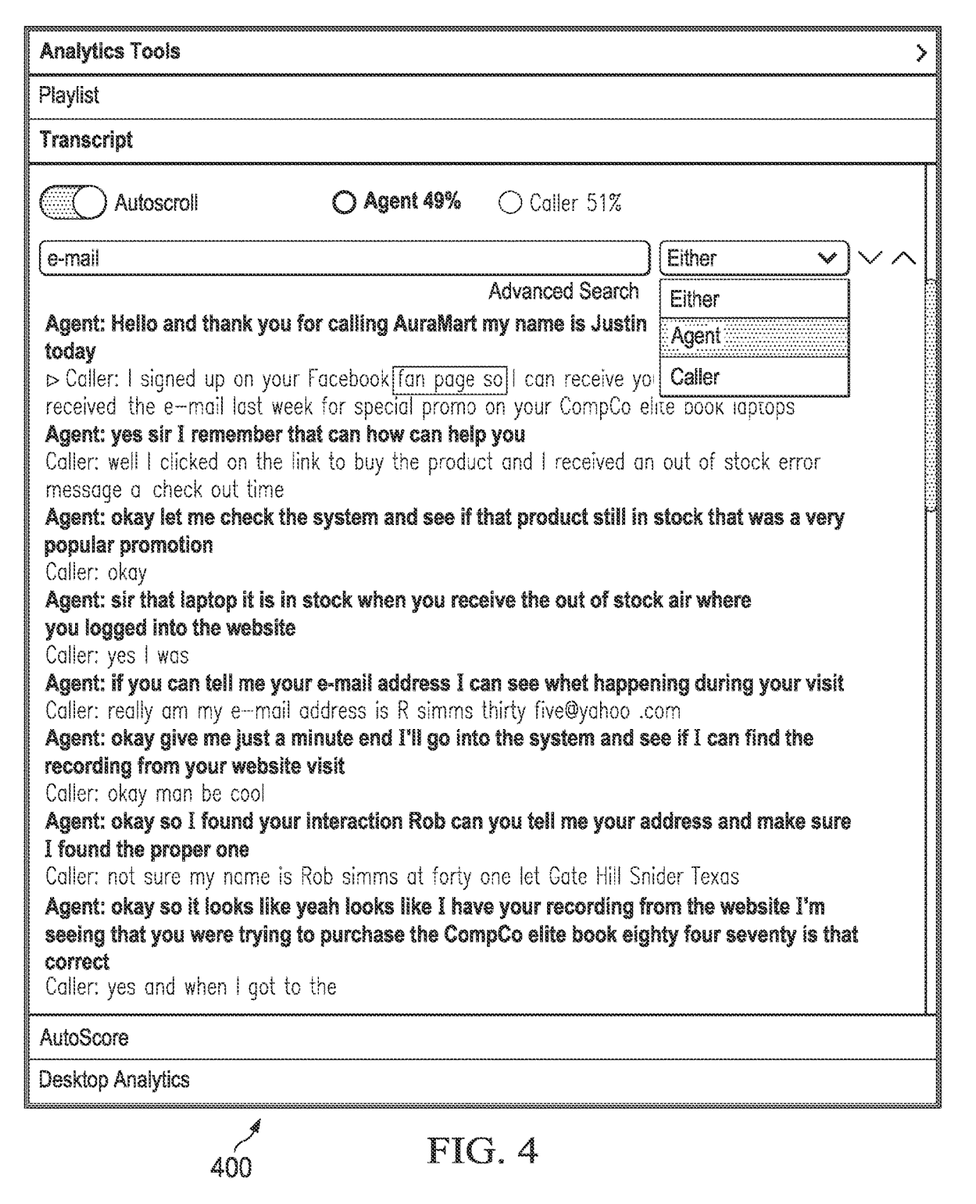
FIG. 4 depicts a diagrammatic representation of an administrative interface with analytics tools according to some embodiments.

Identifying conversation roles have many practical uses. For instance, for quality assurance (QA) and/or compliance reasons, a computing facility such as a QA system with compliance rules downstream from the agent classifier may receive results from the agent classifier and determine whether the agent introduces itself properly (i.e., that compliance rules have been met), whether processes defined for the contact and the interactions were followed correctly, and so on. FIG. 4 depicts a diagrammatic representation of an administrative interface 400 with example analytics tools according to some embodiments.

In the past, it may not be important to know the roles of speakers in a conversation. Today, it has become increasingly important to identify the roles in a conversation because many applications (e.g., compliance, training, etc.) require the knowledge of whether an agent is in compliance and/or is following predetermined procedures, policies, rules, etc. in responding to a call from a customer. For example, a customer calling a customer service line may say that "I want to sue you" or "I need to talk to your supervisor." The QA system can automatically monitor the agent's words while the conversation is ongoing and coach the agent to respond appropriately in real time.

As alluded to above, the text mining engine running on the AI platform has a categorization functionality called classification that can classify textual information based on what it knows (e.g., from a knowledgebase 224 which stores transcripts of conversations). In embodiments disclosed herein, a new knowledgebase can help defining the roles in how agents usually speak and how customers usually speak. This helps the text mining engine to learn to identify, for instance, Speaker 1 is 95% an agent and speaker 2 is 98% a customer.

Those skilled in the art appreciate that machine learning is a field of study in AI and involves algorithms that learn from examples in a particular problem domain. In this case, the problem domain is conversation role identification. These examples can be divided into training data and testing data. Classification is a task that requires the use of machine learning algorithms to learn how to assign a class to input examples in the training data. There are different types of classification predictive modeling, including binary classification and multi-class classification. The former predicts a binary result (e.g., Speaker 1 is either an agent or a customer), while the latter predicts one or more than two classes (e.g., Speaker 1 is an agent, a manager, or a customer). Classification predictive modeling algorithms that can be leveraged to train the text mining engine to classify conversation roles for speakers may vary from implementation to implementation. Non-limiting examples may include logistic regression, k-nearest neighbors, decision trees, support vector machine, naïve bayes, etc. Other machine learning algorithms may also be utilized. Testing data can be used to measure and improve the performance (e.g., accuracy) of the text mining engine.

Optionally, knowledge learned from a new conversation can be provided to the text mining engine in a feedback loop to help this feature to become even smarter. Over time, the text mining engine can learn to adapt to different environments (e.g., vertical markets, which can be taxonomy-specific, including tech support, financial industry, etc.), have different domain knowledge (e.g., with respect to the natural language(s) spoken in a conversation—English, Spanish, German, etc.). Additionally, the text mining engine can leverage speech analysis tools (e.g., general population vs. medical field). As the text mining engine gets smarter (with the continuous refinement of the knowledgebase for identification of conversation roles, the differences between vertical markets may become insignificant.

In document-based processing such as emails, it is relatively straightforward to identify the roles due to metadata already included with the documents. For instance, an email has data fields identifying a sender and a receiver, so there is no need for role identification. In audio, there is not an easy way to identify roles as there is no document metadata describing the conversation. This invention is about 98-97% correct in identifying conversation roles, so the result can be used in analytics for various purposes (e.g., interaction analysis, compliance analysis, etc.).

Figure 6:
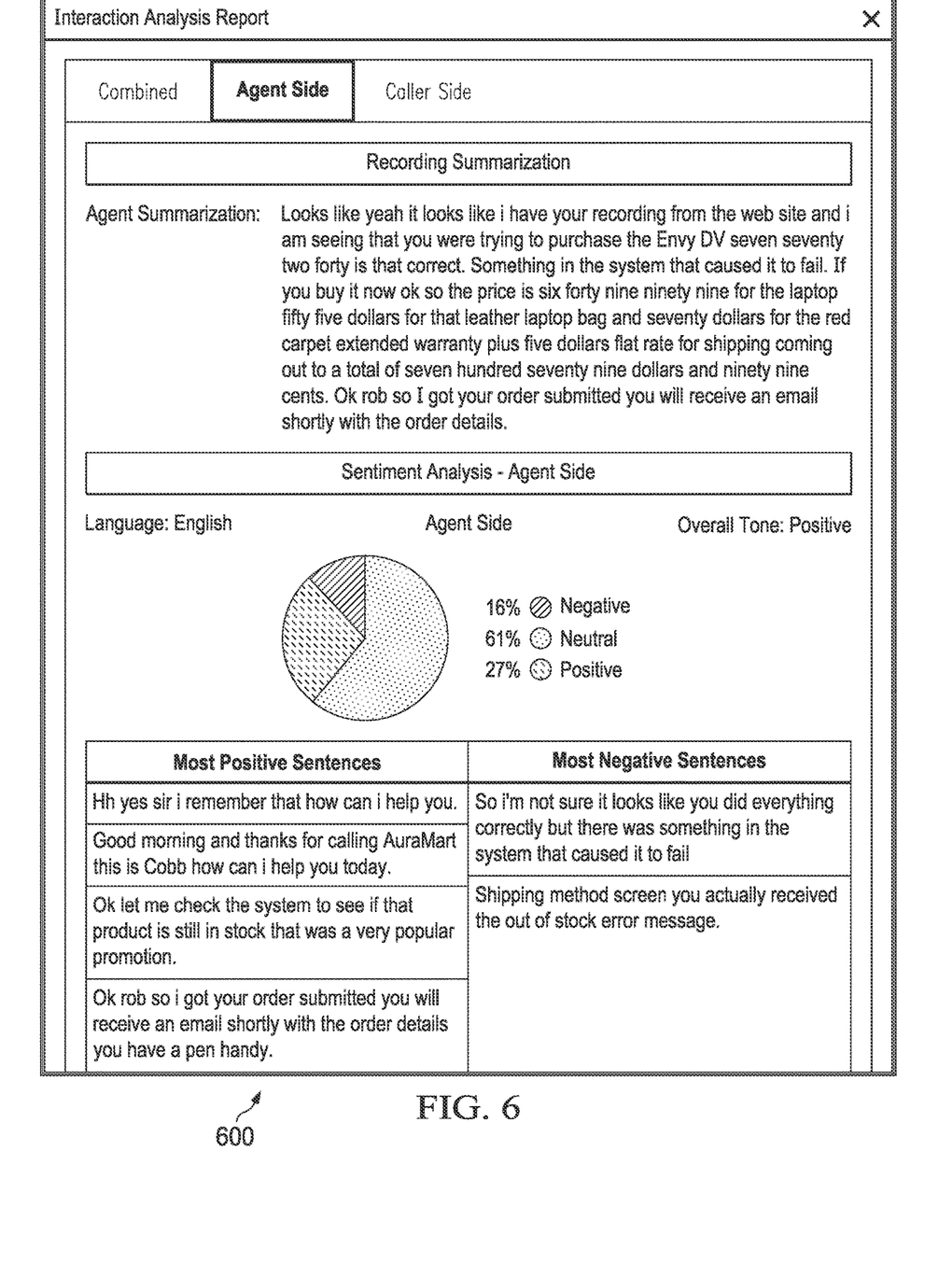
FIG. 6 shows an example of an interaction analysis report that is generated by a CEM system using outputs from a text mining engine running on an AI platform according to some embodiments.
Figure 7:
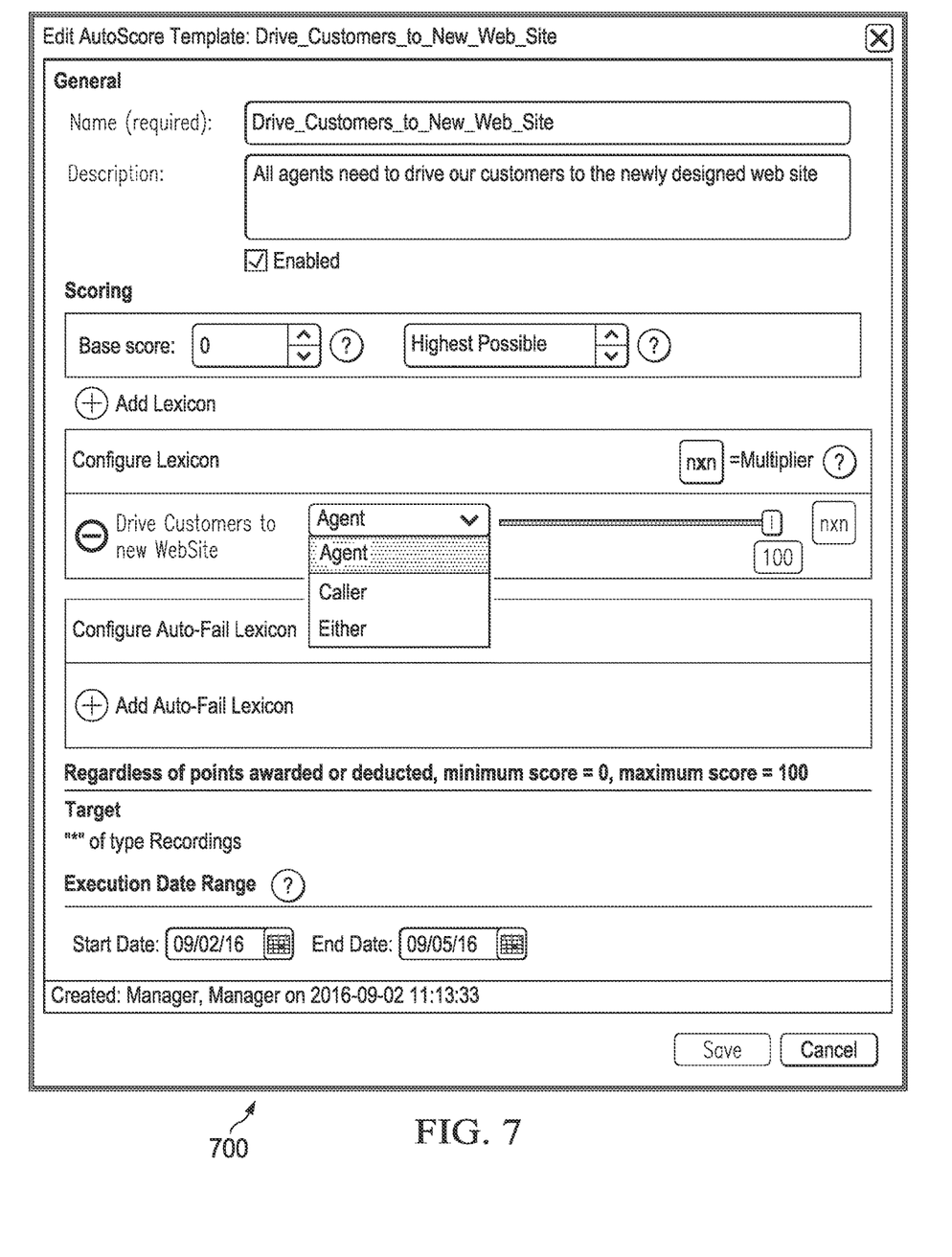
FIG. 7 depicts a diagrammatic representation of an administrative interface with configurable options for driving customers to a particular web site according to some embodiments.

FIG. 6 shows an example of an interaction analysis report that is generated using outputs from a text mining engine. Outputs from the text mining engine can include results from, in addition to the new capability of conversation role identification, various capabilities of the text mining engine, including a sentiment analysis, summarization, conversation role identification, language detection, etc. In the example of FIG. 6, the interaction analysis report includes a summarization of what the agent said in the conversation and the agent's overall tone. This kind of report can be helpful in agent training, QA, etc. For instance, as illustrated in FIG. 7, an administrator can set up or otherwise configure AI-driven QA measures through a QA configuration page 700 of the administrative interface to determine whether, based on processed conversations, whether agents involved in the conversations are driving the callers to a new website.

Figure 5:
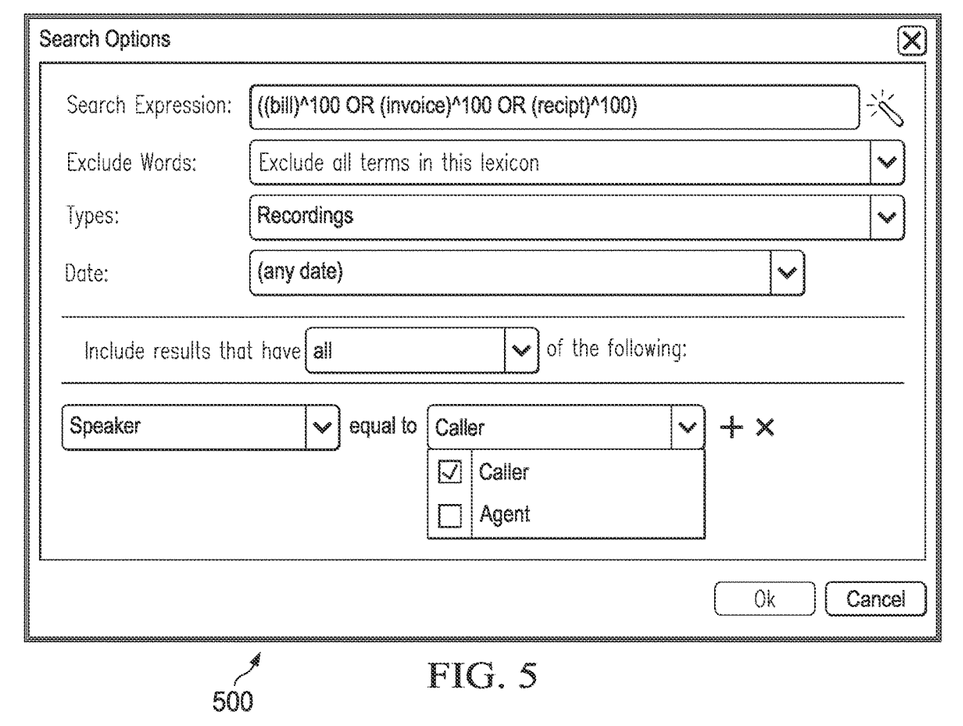
FIG. 5 depicts a diagrammatic representation of an administrative interface with search options according to some embodiments.

In some embodiments, administrative interface 240 can include analytics tools that can be used by an administrator to run various analytics, search, and/or provide feedback to machine learning. Feedback from training can be an ongoing mechanism, for instance, using a training set in which caller 1 is known as the agent and caller 2 is known as the customer. After each training, the text mining engine is tested using a test set. In some embodiments, a search function with search options may be provided through the administrative interface (e.g., search a transcript where a caller said "bill" or "invoice" or "receipt," as illustrated in FIG. 5.

As discussed above, an audio from a conversation is converted to text and then analyzed. In some embodiments, the text mining engine associates a role with spoken words found in a conversation by attributes (characteristics). The first few (e.g., 4 or 5, which is a configurable number) sentences of both speakers are passed (e.g., by agent classifier 212) to the text mining engine. The text mining engine analyzes the sentences and determines that certain words (e.g., "guarantee," "loan," etc.) were spoken. These words represent unique customer call characteristics of the conversation. The text mining engine checks the knowledgebase (e.g., Content 1="warrantee" is not ok, but Content 2="warrantee" is ok), weighs those words on the likelihood of being spoken by an agent or a customer, and scores (but not output). The text mining engine returns a classification of either an agent or a customer (e.g., speaker 1 is an agent and speaker 2 is a customer).

Example Output

Content 1=agent
Content 2=customer
Any metadata thus obtained can be stored in a data store.

The system shown in FIG. 2 does not need to process all the text from the conversation. In some embodiments, the system may process only a portion of the text (e.g., 2-3 sentences of each speaker). That is, the system can linguistically differentiate roles based on the first 2-3 sentences of each speaker in a conversation. As a non-limiting example, the processes can be as follows:

Record a conversation; convert a portion of the audio from the conversation to text, process 2-3 sentences of each speaker to the text mining engine, and place speak 1 in the first bucket (e.g., "Content 1") and speaker 2 in the second bucket (e.g., "Content 2"). Make the second call to the text mining engine and repeat the same process. However, this time speaker 2 is placed in Content 1 and speaker 1 is placed in Content 2.

Feedback can fix the first call if the roles were wrong. The transcription engine (which performs the audio-to-text transcription) always gives two buckets: everything speaker 1 says is in one string and everything speaker 2 says is in one string. The system passes these strings to the text mining engine. Where necessary, the data can be normalized so the input to the text mining is always in the right format. The engine can tag what the engine thinks it is. If it is wrong based on the negative feedback, it can go back and correct the tags.

In some embodiments, if a conversation involves multiple speakers, the system may still only classify customer(s) and agent(s). That is, multiple speakers may be ignored (e.g., filtered out) or they may be classified into two buckets: agents and customers. In some embodiments, however, the system may classify multiple roles (e.g., supervisor, manager, agent, customer, etc.) by finding the right attributes to associate with the different roles.

Figure 8:
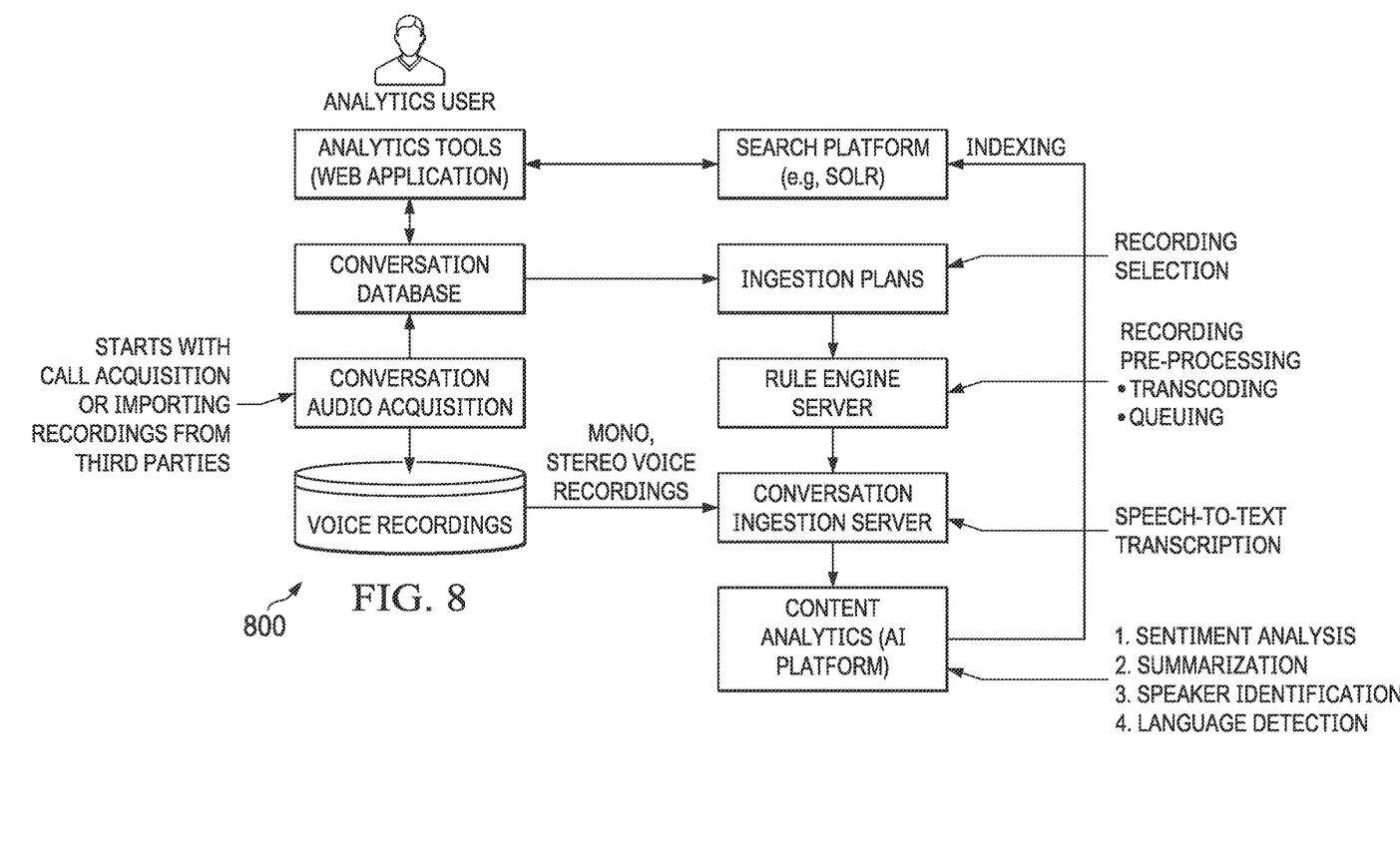
FIG. 8 depicts a flow diagram illustrating a process for identifying conversation roles for CEM purposes, utilizing a text mining engine of an AI platform according to some embodiments.

Those skilled in the art appreciate that the invention described above can be implemented in various ways. FIG. 8 depicts a flow diagram illustrating another example of a process 800 for identifying conversation roles for CEM purposes.

In the example of FIG. 8, an analytics user may access a web application that provides analytics tools for conversation role identification and related tasks. The web application is communicatively connected to a search platform and a conversation database that stores conversations acquired from voice recordings. The conversations may be acquired, through a conversation audio acquisition module, from voice recordings stored in a data store. The voice recordings may be converted to transcripts of text by a conversation ingestion server. The conversations stored in the conversation database may be provided to a rules engine server for pre-processing according to ingestion plans. The rule engine server is adapted for pre-processing the conversations such as transcoding and queuing. In addition to the rule engine server, the conversation ingestion server is communicatively connected to a data store storing the voice recordings. The conversation ingestion server outputs transcripts of the conversations as input to content analytics (performed by the text mining engine) on the AI platform. Examples of content analytics can include, but are not limited to, sentiment analysis, summarization, speaker identification, language detection, etc. As illustrated in FIG. 8, outputs from the content analytics are indexed by the search platform (and stored in an index) so that the processed conversations, which include conversation role identifications, can be searchable by the analytics user.

Figure 9:
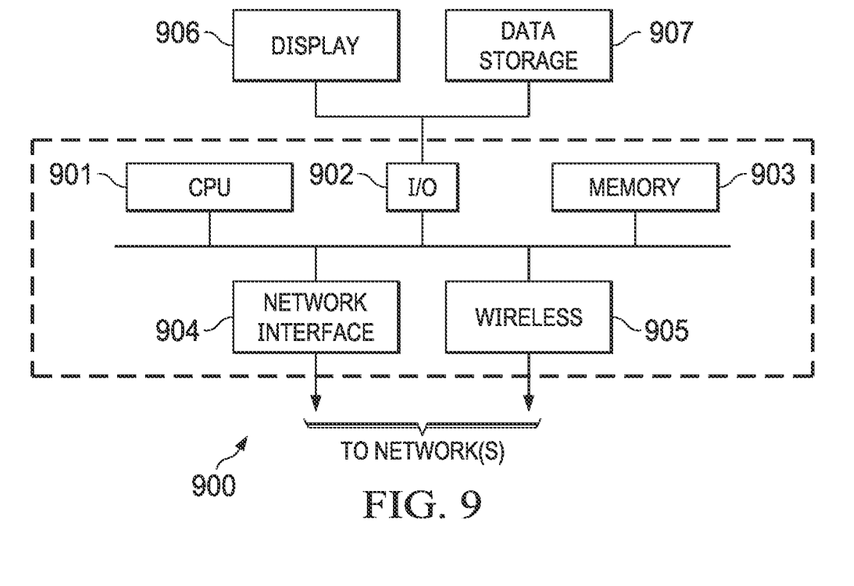
FIG. 9 depicts a diagrammatic representation of a data processing system for implementing an embodiment disclosed herein.

FIG. 9 depicts a diagrammatic representation of a data processing system for implementing an embodiment disclosed herein. As shown in FIG. 9, data processing system 900 may include one or more central processing units (CPU) or processors 901 coupled to one or more user input/output (I/O) devices 902 and memory devices 903. Examples of I/O devices 902 may include, but are not limited to, keyboards, displays, monitors, touch screens, printers, electronic pointing devices such as mice, trackballs, styluses, touch pads, or the like. Examples of memory devices 903 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 900 can be coupled to display 906, information device 907 and various peripheral devices (not shown), such as printers, plotters, speakers, etc. through I/O devices 902.

Data processing system 900 may also be coupled to external computers or other devices through network interface 904, wireless transceiver 905, or other means that is coupled to a network such as a local area network (LAN), wide area network (WAN), or the Internet. Those skilled in the relevant art will appreciate that the invention can be implemented or practiced with other computer system configurations, including without limitation multi-processor systems, network devices, mini-computers, mainframe computers, data processors, and the like.

The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips.

Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HyperText Markup Language (HTML), Python, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any [,] hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method, comprising:
receiving or obtaining, by a system executing on a processor, a transcript of a conversation comprising multiple participants while the conversation is ongoing, wherein the transcript is generated from an audio of the conversation utilizing a speech-to-text recognition tool and wherein the transcript comprises text associated with the multiple participants and has no metadata describing participants of the conversation;
making, by the system, in real time, while the conversation is ongoing, an application programming interface (API) call with the transcript to a text mining engine running on an artificial intelligence platform, wherein the API call specifies a categorization functionality of the text mining engine for identifying conversation roles of the multiple participants of the conversation from the transcript comprising text associated with the multiple participants, wherein the text mining engine is a machine learning model trained using examples of conversations among people with known conversation roles, and wherein performing the categorization functionality by the text mining engine includes analyzing words in the transcript comprising text associated with the multiple participants that represent unique characteristics of the conversation and determining, based on the unique characteristics of the conversation and utilizing classification predictive modeling, a conversation role for each of the multiple participants of the conversation, wherein the text mining engine identifies individual speakers of the multiple participants by performing content analytics only on the transcript, with no further metadata describing participants of the conversation, wherein the text mining engine is configured with an automatic feedback loop to continuously provide the text mining engine with knowledge obtained from new conversations, and wherein the transcript passed to the text mining engine includes a predefined amount of initial text from each of the multiple participants;
receiving, by the system, outputs from the text mining engine in real time, while the conversation is ongoing, the outputs including identification of the conversation roles of the multiple participants of the conversation included in the transcript; and
storing, by the system in an index, the identification of the conversation roles of the participants of the conversation, wherein the index is searchable by a search engine.

2. The method according to claim 1, wherein the text mining engine is adapted for performing, in addition to the categorization functionality, at least one of a sentiment analysis, summarization, or language detection.

3. The method according to claim 2, wherein the conversation roles consist of an agent and a customer.

4. The method according to claim 3, further comprising: generating an interaction analysis report on the agent, the customer, or both, the interaction analysis report including a tonality result from the sentiment analysis.

5. The method according to claim 3, further comprising: generating an administrative interface with analytics tools for analyzing what is said in the conversation by the agent, a caller, or both.

6. The method according to claim 3, further comprising: generating an administrative interface with quality assurance configuration input fields for setting up quality assurance measures for determining whether the agent meets a quality assurance goal.

7. The method according to claim 1, further comprising: generating an administrative interface with a search function supported by the search engine.

8. The method of claim 1, further comprising, in response to receiving the outputs from the text mining engine, initiating the provision of coaching assistance to a first one of the multiple participants in real time, while the conversation is ongoing.

9. A system, comprising:
a processor;
a non-transitory computer-readable medium; and
stored instructions translatable by the processor for:
receiving or obtaining a transcript of a conversation comprising multiple participants in real time, while the conversation is ongoing, wherein the transcript is generated from an audio of the conversation utilizing a speech-to-text recognition tool and wherein the transcript comprises text associated with the multiple participants and has no metadata describing participants of the conversation;

making, in real time, while the conversation is ongoing, an application programming interface (API) call with the transcript to a text mining engine running on an artificial intelligence platform, wherein the API call specifies a categorization functionality of the text mining engine for identifying conversation roles of the multiple participants of the conversation from the transcript comprising text associated with the multiple participants, wherein the text mining engine is a machine learning model trained using examples of conversations among people with known conversation roles, and wherein performing the categorization functionality by the text mining engine includes analyzing words in the transcript comprising text associated with the multiple participants that represent unique characteristics of the conversation comprising text associated with the multiple participants and determining, based on the unique characteristics of the conversation and utilizing classification predictive modeling, a conversation role for each of the multiple participants of the conversation, wherein the text mining engine identifies individual speakers of the multiple participants by performing content analytics only on the transcript, with no further metadata describing participants of the conversation, wherein the text mining engine is configured with an automatic feedback loop to continuously provide the text mining engine with knowledge obtained from new conversations, and wherein the transcript passed to the text mining engine includes a predefined amount of initial text from each of the multiple participants;

receiving, in real time, while the conversation is ongoing, outputs from the text mining engine, the outputs including identification of the conversation roles of the multiple participants of the conversation included in the transcript; and storing, in an index, the identification of the conversation roles of the participants of the conversation, wherein the index is searchable by a search engine.

10. The system of claim 9, wherein the text mining engine is adapted for performing, in addition to the categorization functionality, at least one of a sentiment analysis, summarization, or language detection.

11. The system of claim 10, wherein the conversation roles consist of an agent and a customer.

12. The system of claim 11, wherein the stored instructions are further translatable by the processor for:

generating an interaction analysis report on the agent, the customer, or both, the interaction analysis report including a tonality result from the sentiment analysis.

13. The system of claim 11, wherein the stored instructions are further translatable by the processor for:

generating an administrative interface with analytics tools for analyzing what is said in the conversation by the agent, a caller, or both.

14. The system of claim 11, wherein the stored instructions are further translatable by the processor for:

generating an administrative interface with quality assurance configuration input fields for setting up quality assurance measures for determining whether the agent meets a quality assurance goal.

15. The system of claim 9, wherein the stored instructions are further translatable by the processor for:

generating an administrative interface with a search function supported by the search engine.

16. The system of claim 9, wherein the stored instructions further comprise instructions translatable by the processor for:

in response to receiving the outputs from the text mining engine, initiating the provision of coaching assistance to a first one of the multiple participants in real time, while the conversation is ongoing.

17. A computer program product comprising a non-transitory computer-readable medium storing instructions translatable by a processor for:

receiving or obtaining a transcript of a conversation comprising multiple participants in real time, while the conversation is ongoing, wherein the transcript is generated from an audio of the conversation utilizing a speech-to-text recognition tool and wherein the transcript comprises text associated with the multiple participants and has no metadata describing participants of the conversation;

making, in real time, while the conversation is ongoing, an application programming interface (API) call with the transcript to a text mining engine running on an artificial intelligence platform, wherein the API call specifies a categorization functionality of the text mining engine for identifying conversation roles of the multiple participants of the conversation from the transcript comprising text associated with the multiple participants, wherein the text mining engine is a machine learning model trained using examples of conversations among people with known conversation roles, and wherein performing the categorization functionality by the text mining engine includes analyzing words in the transcript comprising text associated with the multiple participants that represent unique characteristics of the conversation comprising text associated with the multiple participants and determining, based on the unique characteristics of the conversation and utilizing classification predictive modeling, a conversation role for each of the multiple participants of the conversation, wherein the text mining engine identifies individual speakers of the multiple participants by performing content analytics only on the transcript, with no further metadata describing participants of the conversation, wherein the text mining engine is configured with an automatic feedback loop to continuously provide the text mining engine with knowledge obtained from new conversations, and wherein the transcript passed to the text mining engine includes a predefined amount of initial text from each of the multiple participants;

receiving, in real time, while the conversation is ongoing, outputs from the text mining engine, the outputs including identification of the conversation roles of the multiple participants of the conversation included in the transcript; and storing, in an index, the identification of the conversation roles of the participants of the conversation, wherein the index is searchable by a search engine.

18. The computer program product of claim 17, wherein the text mining engine is adapted for performing, in addition to the categorization functionality, at least one of a sentiment analysis, summarization, or language detection.

19. The computer program product of claim 18, wherein the conversation roles consist of an agent and a customer.

20. The computer program product of claim 19, wherein the instructions are further translatable by the processor for:

generating an interaction analysis report on the agent, the customer, or both, the interaction analysis report including a tonality result from the sentiment analysis.

21. The computer program product of claim 19, wherein the instructions are further translatable by the processor for:
generating an administrative interface with analytics tools for analyzing what is said in the conversation by the agent, a caller, or both.

22. The computer program product of claim 19, wherein the instructions are further translatable by the processor for:
generating an administrative interface with quality assurance configuration input fields for setting up quality assurance measures for determining whether the agent meets a quality assurance goal.

23. The computer program product of claim 17, wherein the instructions are further translatable by the processor for:
in response to receiving the outputs from the text mining engine, initiating the provision of coaching assistance to a first one of the multiple participants in real time, while the conversation is ongoing.

\* \* \* \* \*